April 3, 1934.　　　　H. H. HART　　　　1,953,480
CONDENSING SEPARATOR
Filed June 27, 1933
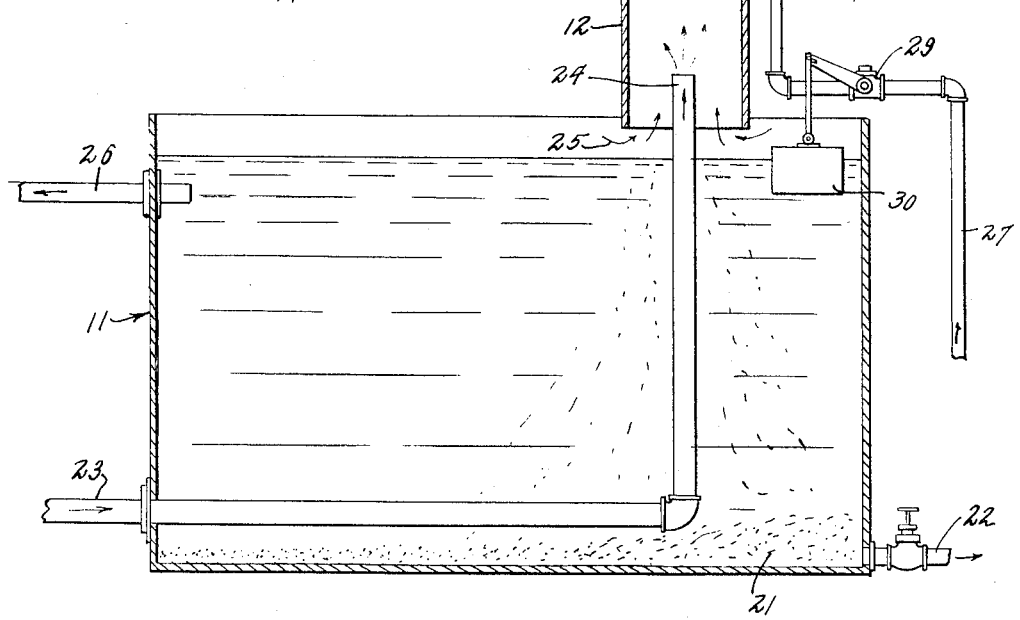
Inventor
Herbert H. Hart
By Lyon+Lyon
Attorneys Patented Apr. 3, 1934

1,953,480

UNITED STATES PATENT OFFICE 1,953,480

CONDENSING SEPARATOR

Herbert H. Hart, Orcutt, Calif., assignor of one-half to Charles E. Dillinger, Orcutt, Calif.

Application June 27, 1933, Serial No. 677,865

6 Claims. (Cl. 261—114)

This invention relates to a condensing separator operable for precipitating the lime and other deleterious substances from the supply or make-up water passed therethrough.

The principal object of this invention is to provide a condensing separator in which the steam discharging therein, will be mixed with an induced supply of relatively cold air, and this mixture of steam and air while traversing an appropriate series of baffle plates thoroughly mixing with the make-up water slowly trickling thereover for not only causing the condensation of the steam, but of even more importance, acting upon the supply or make-up water to precipitate the lime and other deleterious substances therefrom, whereby the precipitates may be carried by the make-up water and moisture resulting from the condensed steam to a suitable settling tank wherein the precipitates will settle and accumulate as a relatively heavy sludge upon the bottom thereof, while the supply or make-up water will be left soft and relatively pure.

A further object is to provide means for automatically regulating the supply of make-up water.

Other objects and advantages of the invention will become apparent as the nature of the same is more fully understood from the following description and accompanying drawing, wherein is set forth what is now considered to be a preferred embodiment. It should be understood, however, that this particular embodiment of the invention is chosen principally for the purpose of exemplification, and that variations therefrom in details of construction or arrangement of parts may accordingly be effected, and yet remain within the spirit and scope of the invention, as the same is set forth in the appended claims.

In the drawing:

Figure 1 illustrates a cross-sectional view of a somewhat diagrammatic representation of the invention, and Figure 2 illustrates an enlarged cross-sectional view taken substantially in the plane of line II—II of Fig. 1.

The preferred form of the condensing separator of this invention as illustrated in the drawing, may include a condensing separator element 10, suitably mounted above settling tank 11.

The condensing separator element 10, which, for convenience, will be referred to as the separating element or separator, may be of such size and capacity as to take care of the requirements for the particular plant of which it is to form a part. It is to be understood that for plants of very large capacities, a plurality of separator units may be used.

The separator 10 may include an outer tubular shell 12 suitably mounted above the settling tank by means not shown, and open at the top and bottom ends. A stack of superimposed baffle plates 13 may be removably mounted within the shell 12. One convenient arrangement for mounting the baffle plates in the separator, may include providing within the tubular shell 12, four equally spaced supporting bars 14, and providing each bar with a series of equally spaced brackets 15 upon which brackets the baffle plates may be suitably mounted. The upper end of each of the supporting bars 14 may be provided with a hook-shaped end 16 for suitably hooking over the top end of the shell for retaining the bars, and thereby the baffle plates in their operative positions.

It will be appreciated that due to this arrangement, the supporting bars and baffle plates may be easily assembled within the shell, and likewise, easily and conveniently removed for cleaning.

This stack of superimposed baffle plates may be arranged as follows: At the top thereof, a screen 17 may be provided for preventing the entrance of foreign matter into the separator, and also to act as an initial means for dividing the inflowing supply or make-up water; next a cone-shaped baffle plate 18, having the cone thereof directed downward and of less diameter than the internal diameter of the shell, whereby the make-water may pass between the periphery thereof, and the shell, and just below the cone-shaped baffle may be positioned a disc baffle 19 of such diameter as to nicely fit within the shell, and provided with a central orifice 20 for the passage of the make-up water therethrough, during its course through the separator. The remaining stack of baffle plates may include alternate cone and disc baffles, the number of which will vary, depending upon the capacity of the plant. However, it is desirable to arrange the stack of baffle plates whereby the last baffle thereof, will be of the cone type for diverging the inflowing steam and induced air.

The settling tank 11 may be an ordinary wood or metal tank of sufficient size to contain enough water to enable the lime or other deleterious substances to settle to the bottom thereof, as indicated at 21, which precipitated sludge may be drawn therefrom through valved outlet 22.

It is desirable to run the steam pipe 23 through the tank so as not only to effect the heating of the feed water contained therein, but also to assist in the partial condensation of the steam passing through the pipe.

The end 24 of the steam pipe may project for a short distance into the lower end of the separator shell, whereby the steam discharging therefrom, will cause an induction of air into the open end of the separator as indicated by the arrows 25.

As may be noted from Fig. 1, the lowermost baffle plate of the superimposed stack, should be spaced some distance above the discharge end 24 of the steam pipe, whereby the steam and air may thoroughly mix before contacting with the baffle plates.

A feed water pipe 26 may communicate through the end of the tank furthest from the position of the separator, whereby the water discharged from the separator, may have sufficient time during its travel from the separator to the discharge pipe for the deleterious matter carried thereby, to fully precipitate therefrom. Also, the feed water pipe should be positioned just slightly below the low water level of the tank, so as to not only withdraw the hottest, but also the purest water therefrom.

The supply or make-water pipe 27 may be provided with a discharge end 28 positioned directly above the screen 17 of the separator.

Means may be provided for automatically controlling the supply of make-up water, which means may include a valve 29 located in the supply pipe and actuated by the float 30, whereby the water level in the settling tank may be maintained at a constant level.

In the normal operation of the invention, the steam pipe 23 may be connected to the exhaust pipe of the usual steam engine or other steam actuated mechanisms, while the feed water pipe may be connected to the means for forcing the feed water to the steam generating means, and the supply pipe 27 connected with a source of supply water.

If the settling tank 11 were empty, the float 30 would open valve 29 to permit the supply water to pass through the separator, until the water level in the settling tank reached a predetermined level, whereupon the float would act to shut off the supply water.

The force of the exhaust steam discharging from the pipe end 24 into the separator, will cause a considerable amount of relatively cold air to be drawn into the separator, and mixed with the steam, and this mixture of air and steam will travel a circuitous course up through the separator while passing over the baffle plates, and will thus be thoroughly mixed with the supply or make-up water, which will be slowly trickling over the baffle plates while passing down through the separator.

The mixing of the air and steam with the relatively cold make-up water, will not only act to condense the steam, but also to soften the make-up water by causing the lime and other deleterious substances to be precipitated therefrom. The precipitates from the make-water will, for the greater part, be washed along with the make-up water, and condensate from the steam, and finally discharged from the separator into the settling tank, wherein the lime and deleterious substances will separate from the water and settle as a sludge upon the tank bottom and may be drawn off at intervals, through the valved outlet 22.

The water drawn from the tank will be relatively free of scaling material or other foreign matter, and may be used in the steam generator, without causing the usual heavy deposit of scale therein, thus greatly increasing the efficiency, steaming capacity and life thereof.

What I claim is:

1. In a condensing separator, a settling tank, a separator communicating at one end therewith, a water supply pipe arranged to discharge into the other end of the separator, and a steam pipe communicating with the one end of the separator and arranged to induce a supply of air therein.

2. In a condensing separator, a settling tank, a separator communicating at one end therewith, a series of baffle plates mounted in the separator, a water supply pipe arranged to discharge into the other end of the separator, and a steam pipe communicating with the one end of the separator and arranged to induce a supply of air therein.

3. In a condensing separator, a settling tank, a separator communicating at one end therewith, a water supply pipe arranged to discharge into the other end of the separator, a steam pipe communicating with the one end of the separator and arranged to induce a supply of air therein, a control valve mounted in the supply pipe, and means operable by the water in the tank for actuating the control valve for maintaining a predetermined water level within said tank.

4. In a condensing separator, a settling tank, a vertical open-ended separator mounted thereover, a steam pipe arranged to pass through the tank and to discharge into the lowermost open end of the separator for inducing a supply of air to flow into the separator and to mix therein with the discharged steam, a water supply pipe arranged to discharge into the upper end of the separator, a control valve mounted in the supply pipe, means operable by the water contained in the tank for actuating the control valve for maintaining a predetermined water level within said tank, and a water outlet pipe communicating with the tank at a point well above the bottom thereof, but below the minimum low water level thereof.

5. In a condensing separator, a settling tank, a vertical open-ended separator mounted thereover adjacent one side thereof, a steam pipe arranged to pass through the tank and to discharge into the open bottom end of the separator for inducing a supply of air to flow into the separator and to mix therein with the discharged steam, a water supply pipe arranged to discharge into the upper end of the separator, a control valve mounted in the supply pipe, means operable by the water contained in the tank for actuating the control valve for maintaining the water level in the tank at a predetermined distance below the bottom end of the separator, and a water outlet pipe communicating with the other side of the tank at a point well above the bottom thereof but below the minimum low water level thereof.

6. In a condensing separator, a settling tank, a vertical open-ended separator mounted thereover adjacent one side thereof, a series of baffle plates mounted in the separator, a steam pipe arranged to pass through the tank and to discharge into the bottom end of the separator for inducing a supply of air to flow into the separator and to mix therein with the discharged steam, a water supply pipe arranged to discharge into the upper end of the separator, a control valve mounted in the supply pipe, means operable by the water contained in the tank for actuating the control valve for maintaining the water level in the tank at a predetermined level below the bottom end of the separator, and a water outlet pipe communicating with the other side of the tank at a point well above the bottom thereof but below the minimum low water level thereof.

HERBERT H. HART.